United States Patent [19]
Kranich

[11] Patent Number: 5,524,225
[45] Date of Patent: Jun. 4, 1996

[54] CACHE SYSTEM AND METHOD FOR PROVIDING SOFTWARE CONTROLLED WRITEBACK

[75] Inventor: Uwe Kranich, Arberweg, Germany

[73] Assignee: Advanced Micro Devices Inc., Sunnyvale, Calif.

[21] Appl. No.: 993,095

[22] Filed: Dec. 18, 1992

[51] Int. Cl.$^6$ ............................................. G06F 12/08
[52] U.S. Cl. ...................................... 395/403; 395/470
[58] Field of Search .............................. 395/400, 425, 395/470, 403; 364/200 MS File, 900 MS File, DIG. 1, DIG. 2

[56] References Cited

U.S. PATENT DOCUMENTS

| | | |
|---|---|---|
| 4,713,755 | 12/1987 | Worley, Jr. et al. .................... 395/425 |
| 5,247,648 | 9/1993 | Watkins .................................. 395/425 |
| 5,263,142 | 11/1993 | Watkins et al. ......................... 395/425 |
| 5,307,477 | 4/1994 | Taylor et al. ........................... 395/425 |

Primary Examiner—Jack A. Lane
Attorney, Agent, or Firm—Foley & Lardner

[57] ABSTRACT

A method and mechanism for controlling the data transfers between a system memory and a cache memory is provided. The mechanism includes a cache controller with a physical address register coupled to a bus. Software may alter the operation of the cache controller to force blocks in the cache memory to be written back to the system memory by sending control signals to the physical address register over the bus.

10 Claims, 3 Drawing Sheets

CACHE SYSTEM AND METHOD FOR PROVIDING SOFTWARE CONTROLLED WRITEBACK

FIELD OF INVENTION

The present invention relates to a system and method for controlling cache operations, and more particularly to a system and method for caching system memory in an embedded cache memory.

BACKGROUND OF INVENTION

One way to increase the performance of a computer system is to increase the data transfer rate of the memory used in the system. However, the cost of memory increases dramatically with the speed of the memory. Thus, it is rarely practical to use the fastest memory available, especially in systems which require large quantities of memory. Consequently, it has been discovered that by using a relatively small bank of relatively high-speed memory ("cache memory") as a buffer for a larger bank of slower memory ("system memory"), system performance can be greatly improved. For example, magnetic media, such as "hard disks", provide much less expensive, but much slower storage than random access memory ("RAM"). By allocating a relatively small portion of RAM to function as a cache memory between a hard disk and a microprocessor, the time required for operations which access data stored on the hard disk can be significantly decreased.

The data transfers between the system memory and cache memory are controlled by a cache controller. A cache controller manages the cache memory based upon the needs of the microprocessor. For example, if the microprocessor requires information that is not currently stored in the cache memory, the data must be transferred from the slower system memory to the cache memory before it may be accessed by the microprocessor. If all of the cache memory blocks are allocated, then the cache controller must determine which data in the cache memory should be stored back to the system memory to allow storage space for the new memory.

Cache controllers may generally be implemented in hardware or software. The disadvantage of software implemented cache controllers is that they generally require valuable resources. For example, a software-implemented hard disk cache typically requires RAM for a cache buffer, RAM for cache controller instructions, and processing time to execute the controller instructions. The RAM used for the cache memory and controller instructions would otherwise have been available for use by an application. Likewise, the processing time of the cache controller would otherwise have been available for the execution of an application. Because the software cache controller and applications must compete for the same resources, overall system performance is diminished.

Consequently, microprocessors have been developed which include built-in cache memory and cache controller hardware. By building the cache memory and control hardware directly into a microprocessor, users may benefit from the increased performance provided by cache without having to add cache control code to their software. In fact, because the cache memory control is handled entirely by built-in hardware, cache operations are virtually transparent to a user. Further, the hardware cache control does not compete with applications for the processing and storage resources of the system.

However, for some applications it would be desirable to customize the operation of a hardware cache controller to improve the performance of an application. For example, the caching of data associated with special devices, such as graphics devices, is not possible using the generic caching provided by hardware cache controllers. Since current built-in hardware cache controllers are independent of and inaccessible to software, such application-specific cache control customization is not possible. It is therefore clearly desirable to provide a hardware cache controller that can operate transparent to a user, but which further allows a user to modify or affect cache control operations. It is further desirable to provide a cache controller that allows data associated with special devices to be cached.

SUMMARY OF INVENTION

The present invention provides a cache system which generally includes a system memory, a cache memory coupled to the system memory, a cache controller, and a bus coupled to the cache memory and the cache controller. The cache controller controls the transfer of data between the system memory and the cache memory and includes controlling means for causing data in the cache memory to be written back to the system memory in response to software initiated control signals.

The present invention further provides a cache controller embedded in a microprocessor. The cache controller includes a physical address register coupled to a bus and a cache memory, a software/hardware controlled writeback cache controller ("SHWCC") coupled to the physical address register and the cache memory, and a cache allocation circuit coupled to the SHWCC and the cache memory. Software may control the SHWCC through control signals transmitted from a processing unit to the physical address register.

The present invention further provides a method for controlling a cache controller. The method includes the steps of causing a processing unit to initiate a control signal which includes a physical address corresponding to a block of a system memory, and transmitting the control signal to a physical address register. The method further includes the steps of causing a SHWCC to sense the arrival of the control signal at the physical address register, and writing back to the system memory the data in the cache memory which originated at the block in the system memory indicated by the physical address when the arrival of the control signal is sensed.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings, in the several figures of which like reference numerals identify like elements, and wherein:

DETAILED DESCRIPTION

Figure 1:
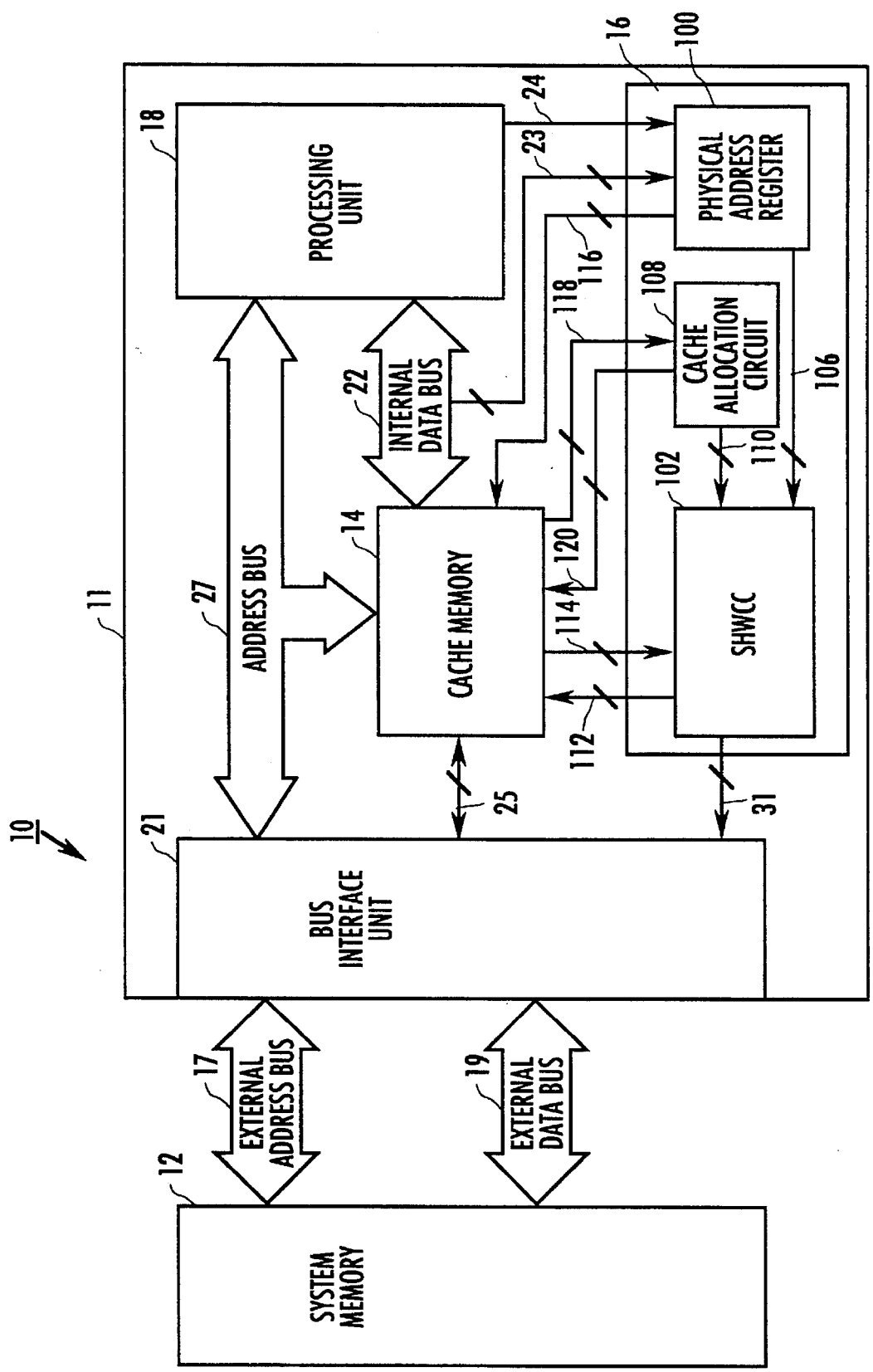
FIG. 1 is a block diagram of a cache system configured according to one embodiment of the present invention.

Referring now to FIG. 1, it illustrates in block diagram form a cache system 10 embodying the present invention. The cache system 10 generally includes a system memory 12 coupled to a processor 11 via an external address bus 17 and an external data bus 19.

The processor 11 generally comprises a cache memory 14, a cache controller 16, a processing unit 18, and a bus interface unit 21. The cache memory 14 is coupled to the processing unit 18 by an internal address bus 27 and an internal data bus 22. The cache memory 14 is further coupled to the bus interface unit 21 by the internal address bus 27 and by a data bus 25. In addition, the cache memory 14 is coupled to the cache controller 16 by a plurality of buses 112, 114, 116, 118, and 120.

The cache controller 16 is coupled to the internal data bus 22 by a bus 23, and to the bus interface unit 21 by a bus 31. The cache controller 16 is further coupled to the processing unit 18 by a bus 24. The bus interface unit 21 is coupled to the system memory 12 by the external buses 17 and 19.

The processing unit 18 generally represents those components of processor 11 which execute programmed instructions and manipulate data. The cache memory 14 is disposed between the system memory 12 and the processing unit 18 to provide the processing unit 18 faster access to data.

The bus interface unit 21 handles the data and address buffering for the communications between the processor 11 and external components, such as the system memory 12. The cache controller 16 controls bus interface unit 21, and thus controls the transfer of data between the system memory 12 and the cache memory 14, via data transfer signals sent to the bus interface unit 21 over bus 31. The data transfer signals are responsive to the data needs of the processing unit 18, and to the status of cache memory 14. Specifically, when the processing unit 18 requires data not currently stored in the cache memory 14, the cache controller 16 determines whether there is space available in the cache memory 14 for the data, and if not, which data in the cache memory 14 to write back to the system memory 12 to make space in the cache memory 14 available for the required data.

To provide efficient cache control, the cache controller 16 must keep track of the status of the data within the blocks of the cache memory 14. For example, the cache controller 16 may maintain in a portion of the cache memory 14 (such as a tag array), status information for each block of data in the cache memory. The status information for each cache data block typically includes whether the block is available to receive new data ("availability status"), whether the data within the block has been modified ("modification status"), whether the data within the block is shared or exclusive ("shared status"), how recently the data within the block was accessed by the processing unit 18 ("access status"), and which block of system memory 12 was the source of the data contained in the cache block ("source information").

The block of system memory 12 from which a given set of data originates is referred to herein as the "source block" of that data. In addition, the block in cache memory 14 that is being used to buffer the data from a source block is referred to herein as the "host block" of that data.

Cache controller 16 generally includes a physical address register 100, a software/hardware controlled writeback cache controller ("SHWCC") 102, and a cache allocation circuit 108. The SHWCC 102 is coupled to the physical address register 100 by a bus 106, to the cache allocation circuit 108 by a bus 110, to the cache memory 14 by buses 112 and 114, and to the bus interface unit 21 by bus 31.

Physical address register 100 is coupled to the cache memory 14 by bus 116 and to the internal data bus 22 by bus 23, and to the processing unit 18 by bus 24. Cache allocation circuit 108 is coupled to the cache memory 14 by buses 118 and 120.

Thus configured, cache controller 16 may operate in one of two modes. In the first mode, the SHWCC 102 is controlled by the cache allocation circuit 108 in response to data requests generated by processing unit 18 over address bus 27. In the second mode, the SHWCC 102 is controlled by the physical address register 100 in response to software initiated control signals sent by the processing unit 18 over the data bus 22 and bus 24. In the absence of software initiated control signals, cache controller 16 operates in the first mode. However, upon the detection of a software initiated control signal, the cache controller 16 enters the second mode. The first and second modes, as they may be implemented with cache controller 16, will now be described in greater detail with reference to FIGS. 2 and 3, respectively.

Figure 2:
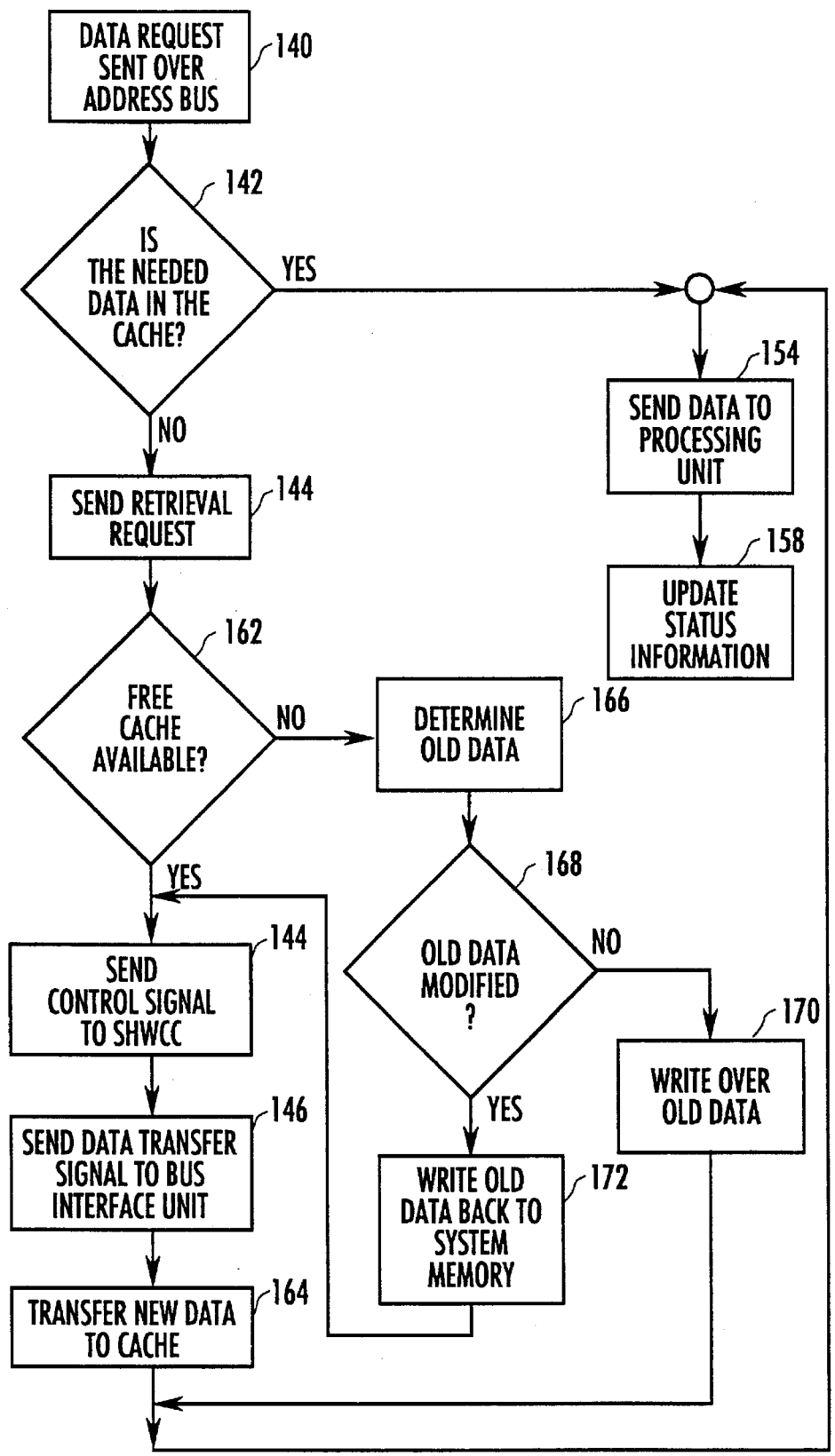
FIG. 2 is a control flow diagram illustrating the operation of a cache controller in the absence of software initiated control signals in accordance with the present invention.

FIG. 2 shows a flow diagram illustrating the manner in which the first mode of cache controller 16 may be implemented. In step 140, the processing unit 18 transmits, via internal address bus 27, the address of data required by the processing unit 18 ("needed data") to the cache memory 14 and to the bus interface unit 21. In step 142, cache memory 14 determines whether the data requested by the processing unit 18 currently resides in the cache memory 14. This determination is made by comparing the address received by the cache memory 14 from the processing unit 18 over the internal address bus 27 with the current source information of the data cache blocks. If the data resides in the cache memory 14, the data is transmitted to the processing unit 18 over the internal data bus 22 in step 154. In step 158, the cache memory 14 updates the cache status information of the host block of the needed data. Specifically, the access status of the host block of the data transmitted to the processing unit 18 is updated to reflect that the data within the host block has been recently accessed, and the modification status of the host block is updated to reflect that the data within the host block has been modified.

If the needed data does not reside in the cache memory 14 then, in step 144, a retrieval request signal is transmitted from the cache memory 14 to the cache allocation circuit 108 via bus 118. In response to the retrieval request, the cache allocation circuit 108 examines the availability status of the various blocks within the cache memory 14 via bus 118 to determine whether any memory blocks are available in step 162. A block of cache memory 14 is available if it is no longer being used to buffer its current contents.

If there are available memory blocks within the cache memory 14, the cache allocation circuit 108 transmits a control signal to SHWCC 102 over bus 110 in step 144. In response, SHWCC 102 transmits a data transfer signal to bus interface unit 21 to cause the bus interface unit 21 to retrieve the needed data from the system memory 12 via the external data bus 19, and to transfer the needed data to the cache memory 14 over bus 25 in step 164. The bus interface unit 21 retrieves the needed data from the system memory 12 by transmitting the address of the source block to the system memory 12 via external address bus 17. Once the needed data is stored in the cache memory 14, the cache memory 14 supplies the needed data to the processing unit 18 over the internal data bus 22 in step 154. In step 158, the cache memory 14 updates the status information of the host block now containing the needed data to indicate the new source block of the data, that the host block in not available, and that the data has recently been accessed and modified.

However, if there are no available blocks in the cache memory 14, cache blocks must be made available to accommodate the needed data. To make a block available, the current contents of the block must be disposed of. Therefore, the cache allocation circuit 108 determines in step 166 which blocks in the cache memory 14 contain data that the processing unit 18 is least likely to require in the near future ("old data"). The old data determination is performed by the cache allocation circuit 108 based upon the access status of the blocks in the cache memory 14 as read over bus 118. For example, the cache allocation circuit 108 may consider the least recently accessed data to be old data.

Once cache allocation circuit 108 has determined which block in cache memory 14 contains old data, the cache allocation circuit 108 in step 168 next examines the modification status of the host block of the old data to determine whether the old data has been modified by the processing unit 18.

If the old data has not been modified, cache allocation circuit 108 sends a control signal to cache memory 14 over bus 120 to cause the cache memory 14 to write the needed data over the current contents of the host block in step 170. Otherwise, in step 172, cache allocation circuit 108 causes the old data to be written back to system memory 12. This is accomplished by transmitting a control signal to SHWCC 102 over bus 110 to cause the SHWCC 102 to send a data transfer signal over bus 31 to bus interface unit 21. In response to the data transfer signal, bus interface unit 21 transfers the old data from the cache memory 14 to the block of the system memory 12 from whence it originated. This transfer is made via bus 25 and external data bus 19. The address of the source block of the old data is also supplied by the bus interface unit over external address bus 17.

Once the old data has been written back to the system memory, the block in cache that contained the old data is available to store the needed data. Specifically, control passes to step 144 to begin the process in which the needed data is supplied to the processing unit 18, as described above.

The cache allocation circuit 108 continuously replaces old data within the cache memory 14 with needed data according to the process illustrated in FIG. 2 unless and until a software initiated control signal is received by the cache controller 16. When a software initiated control signal is received by the cache controller 16, the cache controller enters the second mode, as will now be described with reference to FIG. 3.

Figure 3:
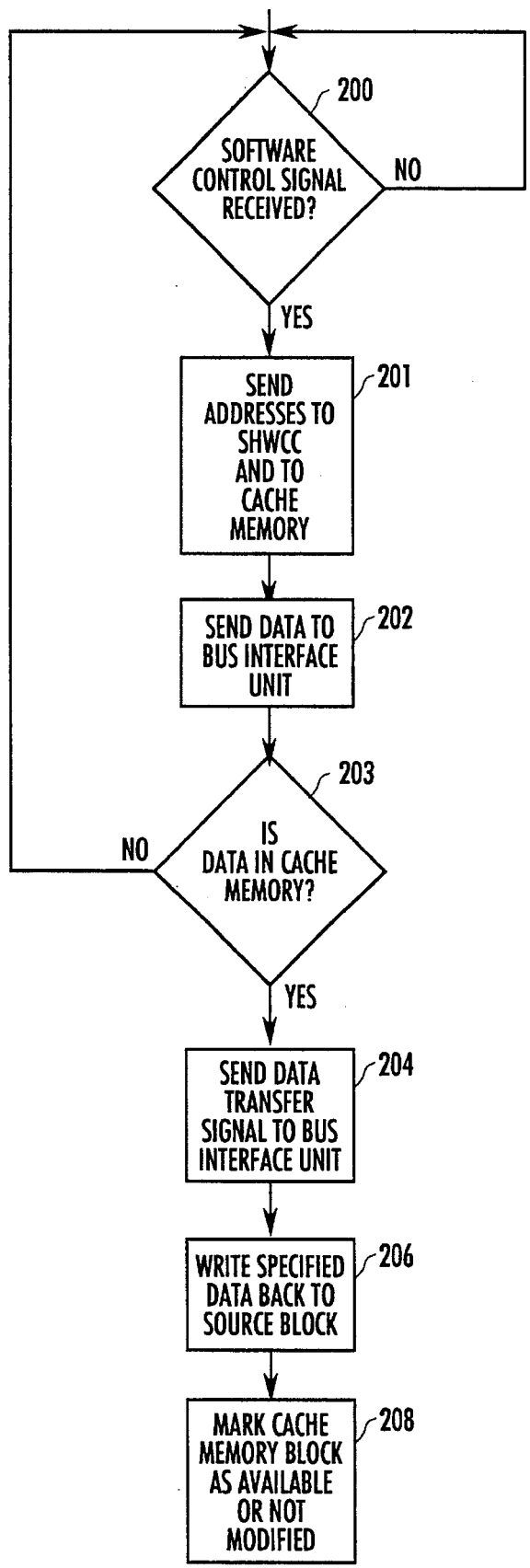
FIG. 3 is a control flow diagram illustrating the operation of a cache controller upon receipt of a software initiated control signal in accordance with the present invention.

Referring to FIG. 3, it is a flow diagram illustrating the manner in which the second mode of cache controller 16 may be implemented in accordance with the present invention. Configured as shown in FIG. 1, the processing unit 18 can, in accordance with the execution of software instructions, access the physical address register 100 via the data bus 22 over bus 23, and via bus 24. Specifically, software may cause the processing unit 18 to explicitly write into the physical address register 100, via data bus 22, an address indicative of a source block of the system memory 12, while sending a control signal to physical address register 100 over bus 24.

In step 200, the cache controller 16 is in the first mode, performing cache control as described above until a physical address which corresponds to a block of the system memory 12 is received in physical address register 100 over bus 23, and a software initiated control signal is received by the physical address register 100 over bus 24. When physical address register 100 receives a software initiated control signal, cache controller 16 enters the second mode and control passes to step 201.

In step 201, the source block address received by the physical address register 100 is transmitted to the SHWCC 102 over bus 106, and to the cache memory 14 over bus 116. Upon receipt of the address over bus 116, cache memory 14 transmits, in step 202, the data corresponding the source block indicated by the address to bus interface unit 21 if such data resides in the cache memory 14. Upon receipt of the address over bus 106, the SHWCC 102 determines, in step 203, the host block, if any, of the data from the source memory block indicated by the received address by inspecting the source information of the cache memory blocks via bus 114. If the data is not in the cache memory 14, no writeback is required and control returns to step 200.

When the data does reside in the cache memory 14, control proceeds to step 204 where the SHWCC 102 transmits a data transfer signal to bus interface unit 21 over bus 31. This causes the data that has been transferred to the bus interface unit 21 to be written back to the system memory 12 over external data bus 19 and the address of the source block to be supplied at external address bus 17. After the specified data has been written back to its source block, in step 208, SHWCC 102 updates the availability or modified status of the host block, marking the host block either as available, or as not modified, via control signals transmitted over bus 112.

Through software initiated writebacks, applications can significantly modify overall cache controller operations. For example, an application can cause data from system memory 12 to be written back from a host block in cache memory 14 to its source block in system memory 12 when the data is not yet considered "old" by the cache allocation circuit 108. For some applications, this ability to force a cache writeback may be crucial. For example, a graphics device may require certain pixel information to update a screen. If the data containing the pixel information has been loaded into cache, it may have been modified. Therefore, the current contents of the block in the system memory 12 which contains the pixel information should not be used to update the screen. However, if the graphics device waits for the cache controller 16 to write back the data according to the first mode control flow of the cache controller 16, the operations of the graphics device may be slowed considerably. Rather than wait for the cache allocation circuit 108 to initiate a writeback, the graphics device can generate a software control signal to force the immediate writeback of the necessary data as described above.

While a particular embodiment of the present invention has been shown and described, modifications may be made. It is therefore intended in the appended claims to cover all such changes and modifications which fall within the true spirit and scope of the invention.

What is claimed is:

1. A cache system, comprising:

a system memory holding data stored in a plurality of physical memory addresses;

a bus interface unit coupled to said system memory by an external address bus and an external data bus;

a cache memory coupled to said bus interface unit by a first internal bus, said cache memory holding data corresponding to a portion of said plurality of physical memory addresses;

a cache controller coupled to said cache memory by a second internal bus, said cache controller coupled to said bus interface unit by a third internal bus, said cache controller being in one of a first mode and a second mode at any given time, said cache controller comprising controlling means for causing data in said cache memory to be written back to said system memory in response to software initiated control signals received by said controlling means in said first mode and for causing said data to be written back to said system memory in response to addresses received by said cache memory over an internal address bus when said cache controller is in said second mode;

a processing unit coupled to said bus interface unit and said cache memory by said internal address bus and an internal data bus, said processing unit coupled to said cache controller by a control bus, wherein said processing unit generates said software initiated control signals to said cache controller over said control bus to operate said cache controller in said first mode, and wherein, in said first mode, addresses of said data in said cache memory to be written to respective physical memory addresses in said system memory via said bus interface unit are received from said processing unit over said internal data bus.

2. The cache system of claim 1, wherein said software initiated control signals are generated over said control bus by said processing unit, and wherein said controlling means includes:

a physical address register coupled to said control bus and said cache memory, said physical address register configured to receive an address indicative of a source block of said system memory when said cache controller is in said first mode to thereby write information currently stored in said cache memory thereto; and a software/hardware controlled writeback cache controller coupled to said physical address register and said cache memory, said software/hardware controlled writeback cache controller configured to control transfer of information from said cache memory to said source block of said system memory.

3. The cache system of claim 2, wherein said software initiated control signals indicate physical addresses of memory blocks in said system memory, wherein said software initiated control signals are applied to said physical address register, wherein said software/hardware controlled writeback cache controller detects when one of said software initiated control signals are applied to said physical address register, and wherein said software/hardware controlled writeback cache controller causes data stored in said cache memory which originated in a memory block of the system memory indicated by said one of said software initiated control signals applied to said physical address register to be written back to said system memory.

4. The cache system of claim 1, wherein said cache memory and said cache controller are embedded in a microprocessor.

5. A cache controller embedded in a microprocessor, comprising:

a physical address register coupled to a bus and a cache memory;

a software/hardware controlled writeback cache controller coupled to said physical address register and said cache memory; and a cache allocation circuit coupled to said software/hardware controlled writeback cache controller and said cache memory, and wherein said software/hardware controlled writeback cache controller is controlled by software commands through data transmitted over said bus to said physical address register, and wherein said cache memory comprises a plurality of host blocks, said host blocks containing data which originated from a plurality of source blocks in a system memory, said data corresponding to memory addresses of said source blocks, and wherein said software/hardware controlled writeback cache controller writes back from said host blocks the data that corresponds to the source blocks represented by the memory addresses corresponding to said data received by said physical address register and sent to said software/hardware controlled writeback cache controller from said physical address register.

6. A method for controlling a cache controller, comprising the steps of:

a) causing a processing unit to initiate a software-initiated write control signal over a control bus to said cache controller;

b) transmitting the software-initiated write control signal over said control bus to a physical address register;

c) transmitting a plurality of physical addresses corresponding to a block of a system memory to both said physical address register over a first internal bus and to a cache memory over an internal data bus concurrently with the transmitting of said software-initiated write control signal in the step b);

d) causing a software/hardware controlled writeback cache controller to sense an arrival of the software-initiated write control signal at said physical address register; and e) writing back to said system memory data in said cache memory which originated at addresses in said system memory indicated by said plurality of physical addresses when the arrival of the software-initiated write control signal is sensed by said software/hardware controlled writeback cache controller.

7. The method of claim 6, further comprising:

f) marking a storage location within a cache memory which held said data which originated at the addresses indicated by said plurality of physical addresses as available data.

8. The method of claim 6, further comprising:

f) marking a storage location within a cache memory which held said data which originated at the addresses indicated by said plurality of physical addresses not modified data.

9. The cache system of claim 1, wherein when said cache memory writes said data to said bus interface unit when said cache controller is in said first mode, said bus interface unit holds said data until said bus interface unit receives a data releasing signal from said cache controller over said third internal bus, wherein said data held in said bus interface unit is then released onto said external data bus to be read into said system memory.

10. The method of claim 6, wherein the data in said cache memory is written back to said system memory in the step e) when said software/hardware controlled writeback cache controller determines that said plurality of physical addresses correspond to addresses currently stored within said cache memory.

* * * * *